United States Patent
Tao et al.

(10) Patent No.: US 10,186,985 B1
(45) Date of Patent: Jan. 22, 2019

(54) ISOLATED FAI 2 CONVERTER WITH CLAMPED VOLTAGE RECTIFIER AND SYNCHRONOUS RECTIFIED SOLUTION

(71) Applicant: Flex Ltd., Singapore (SG)

(72) Inventors: Zhang Tao, Shenzhen (CN); Keting Wang, Shenzhen (CN)

(73) Assignee: Flex Ltd., Singapore (SG)

( * ) Notice: Subject to any disclaimer, the term of this patent is extended or adjusted under 35 U.S.C. 154(b) by 0 days.

(21) Appl. No.: 15/966,890

(22) Filed: Apr. 30, 2018

(30) Foreign Application Priority Data

Apr. 9, 2018 (CN) .......................... 2018 1 0310380

(51) Int. Cl.
*H02M 3/335* (2006.01)
*H02M 7/48* (2007.01)
*H01F 19/00* (2006.01)
*H02M 7/06* (2006.01)

(52) U.S. Cl.
CPC .......... *H02M 7/4826* (2013.01); *H01F 19/00* (2013.01); *H02M 7/068* (2013.01)

(58) Field of Classification Search
CPC ........ H02M 3/335; H02M 3/158; H02M 1/32; Y02B 70/126; H02J 3/383; H02J 3/48
USPC ........ 363/16–20, 21.02, 56.01, 127; 323/285
See application file for complete search history.

(56) References Cited

U.S. PATENT DOCUMENTS

| | | | | |
|---|---|---|---|---|
| 3,461,372 A | * | 8/1969 | Barton | H02M 7/537 327/129 |
| 5,086,381 A | * | 2/1992 | Kameyama | H02M 3/33538 363/16 |
| 7,889,519 B2 | * | 2/2011 | Perreault | H02M 1/34 323/222 |
| 9,318,958 B2 | * | 4/2016 | Sagneri | H02M 3/335 |
| 2010/0308715 A1 | * | 12/2010 | Chou | H01L 27/3288 313/504 |

* cited by examiner

*Primary Examiner* — Rajnikant Patel
(74) *Attorney, Agent, or Firm* — Haverstock & Owens LLP

(57) ABSTRACT

A Fai 2 converter includes an isolated Fai 2 inverter coupled to a resonant rectifier with either clamped diodes or clamped self-driven synchronous rectifiers. The Fai 2 inverter converts an input DC signal to a high-frequency AC signal. The resonant rectifier with either clamped diodes or clamped self-driven synchronous rectifiers rectifies the high-frequency AC signal to a DC signal while clamping the voltage across the clamped diodes or clamped self-driven synchronous rectifiers to the output voltage. Clamping the voltage in this manner minimizes the voltage stress and enables the use of low voltage stress components (diodes or synchronous rectifiers) with low conduction voltage drop.

11 Claims, 8 Drawing Sheets

US 10,186,985 B1

ISOLATED FAI 2 CONVERTER WITH CLAMPED VOLTAGE RECTIFIER AND SYNCHRONOUS RECTIFIED SOLUTION

CROSS-REFERENCE TO RELATED APPLICATION(S)

This application claims priority under 35 U.S.C. § 119 (a)-(d) of the Chinese Patent Application No: 201810310380.7, filed Apr. 9, 2018, and titled, "An Isolated FAI 2 Converter With Clamped Voltage Rectifier And Synchronous Rectified Solution," which is hereby incorporated by reference in its entirety for all purposes.

FIELD OF THE INVENTION

The present invention is generally directed to the power converters. More specifically, the present invention is directed to an isolated Fai 2 converter with clamped voltage rectifier.

BACKGROUND OF THE INVENTION

Power conversion refers to the conversion of one form of electrical power to another desired form and voltage, for example converting 115 or 230 volt alternating current (AC) supplied by a utility company to a regulated lower voltage direct current (DC) for electronic devices, referred to as AC-to-DC power conversion, or converting. Power converters are included as part of the chargers and adapters used by electronic devices such as mobile phones, tablets, laptops, and other mobile electronic devices.

As mobile electronics devices continue to grow in popularity, there are increasing demands for miniaturization (high power density) and portability. In order to achieve such miniaturization and portability, higher switching frequency and higher efficiency are demanded. The size of a power converter is generally related to the device switching frequency and efficiency. A higher switching frequency can decrease the size of energy storage components such as electromagnetic components and electrostatic components. Higher efficiency can decrease the size of a heat sink needed to cool the device. As such, high frequency and high efficiency are future trends in the electronics technology.

A switched-mode power supply, switching-mode power supply or SMPS, is a power supply that incorporates a switching regulator. While a linear regulator uses a transistor biased in its active region to specify an output voltage, an SMPS actively switches a transistor between full saturation and full cutoff at a high rate. The resulting rectangular waveform is then passed through a low-pass filter, typically an inductor and capacitor (LC) circuit, to achieve an approximated output voltage. The switch mode power supply uses the high frequency switch, the transistor, with varying duty cycle to maintain the output voltage. The output voltage variations caused by the switching are filtered out by the LC filter.

An SMPS can provide a step-up, step-down or inverted output voltage function. An SMPS converts an input voltage level to another level by storing the input energy temporarily and then releasing the energy to the output at a different voltage. The storage may be in either electromagnetic components, such as inductors and/or transformers, or electrostatic components, such as capacitors. Advantages of the SMPS over the linear power supply include smaller size, better power efficiency, and lower heat generation.

In order to achieve high frequency and high efficiency, different soft switching technologies, topologies, and converters are emerging, such as converters operating at very high frequency (VHF). Such VHF converters can operate at above 10 MHz switching frequencies. For example, E-type converters and Fai 2 converters can achieve full zero voltage switching (ZVS) on/off for all switch components, such as transistor switches and diodes. FIG. 1 illustrates a schematic circuit diagram of a conventional boost Fai 2 converter. FIG. 2 illustrates a schematic circuit diagram of a conventional isolated boost Fai 2 converter. Each of the Fai 2 converters shown in FIGS. 1 and 2 include a Fai 2 inverter and an E-type rectifier. The Fai 2 inverter in the boost Fai 2 converter of FIG. 1 includes an inductor L1, a transistor switch Q1, a capacitor C1, an inductor L2, and a capacitor C2. The Fai 2 inverter in the isolated boost Fai 2 converter of FIG. 2 includes the inductor L1, the transistor switch Q1, the capacitor C1, the inductor L2, the capacitor C2, and a transformer T1. The transformer T1 includes a primary winding P1 and a secondary winding S1. In both the Fai 2 inverters of FIGS. 1 and 2, the inductor L2 and the capacitor C2 are connected in series and resonate at close to twice the frequency of the transistor switch Q1 switching frequency. The E-type rectifier includes an inductor L3, a capacitor C3, a diode D1 and an output capacitor Cout. A load represented as R_load is connected across the output capacitor Cout. The inductor L3 and the capacitor C3 form an LC network to adjust the output power. For example, the output voltage Vout can be expressed by the equation: Vout=(Req*Z2)/(Req*(Z1+Z2)+(Z1*Z2))*Vac, where Z1 is the impedance of the inductor L3, Z2 is the impedance of the capacitor C3, and Req is an equivalent load seen from the anode of diode D1.

FIG. 3 illustrates voltage waveforms corresponding to the isolated boost Fai2 converter of FIG. 2. The waveform 2 shows the voltage stress Vd2 of the rectifier D1. The waveform 4 shows the drain current Ids of the transistor switch Q1. The waveform 6 shows the driving signal Vgs_Q1 applied to the transistor switch Q1. The waveform 8 shows the drain to source voltage Vds_Q1 of the transistor switch Q1. The waveforms 2-8 show the Fai2 converter is a multi-resonant converter due to the multiple resonant circuit components C1, C2, L2. The inductor L2 and the capacitor C2 are connected in series and resonant at close to twice the frequency of the transistor switch Q1 switching frequency. This results in a low impedance value (close to zero) across the drain to source of the transistor switch Q1 at the second harmonic. The inductor L1 and the capacitor C1 are tuned to make the impedance across the drain to source of the transistor switch Q1 at the fundamental harmonic far greater than the impedance across the drain to source of the transistor switch Q1 at the third harmonic. As a result of such impedance characteristics, the voltage Vds_Q1 has a waveform primarily influenced by the fundamental harmonic and the third harmonic, the contribution attributed to the fundamental harmonic being significantly greater than that of the third harmonic. This results in the waveform 8, the voltage Vds_Q1, having a shape similar to a trapezoid. The trapezoidal waveform provides a lower peak voltage, as compared to a non-Fai 2 converter, and also enables improved zero voltage switching (ZVS) of the transistor switch Q1.

For conventional Fai 2 converters, the voltage stress of the switching components is 2 to 3 times the input voltage. The isolated resonant converter, such as the isolated Fai 2 converter of FIG. 2, has the same characteristic, and the voltage stress on the secondary rectifier diode is 3 to 5 times the output voltage. The higher the voltage stress of the secondary rectifier diode, the higher the conduction voltage drop of the secondary rectifier diode, which reduces overall converter efficiency.

SUMMARY OF THE INVENTION

Embodiments are directed to a Fai 2 converter that includes an isolated Fai 2 inverter coupled to a resonant rectifier with either clamped diodes or clamped self-driven synchronous rectifiers. The Fai 2 inverter converts an input DC signal to a high-frequency AC signal. The resonant rectifier with either clamped diodes or clamped self-driven synchronous rectifiers rectifies the high-frequency AC signal to a DC signal while clamping the voltage across the clamped diodes or clamped self-driven synchronous rectifiers to the output voltage. Clamping the voltage in this manner minimizes the voltage stress and enables the use of low voltage stress components (diodes or synchronous rectifiers) with low conduction voltage drop. The isolation transformer ensures that the input and the output are isolated. The isolation transformer also has the function of changing the primary side voltage level to the secondary side voltage level according to the primary winding to secondary winding turns ratio.

In an aspect, a power converter is disclosed that includes an isolated inverter circuit coupled to an input voltage source, and a resonant rectifier circuit coupled to the isolated inverter circuit. The resonant rectifier circuit comprises a first rectifying element and a second rectifying element. The first rectifying element and the second rectifying element each have a voltage stress limited to an output voltage level of the resonant rectifier circuit. In some embodiments, the isolated inverter circuit comprises an isolated Fai 2 inverter. In some embodiments, the isolated Fai 2 inverter comprises a transistor switch, a first inductor, and a first capacitor, further wherein the first inductor and the first capacitor are tuned to make a first impedance across the drain-to-source of the transistor switch at a fundamental harmonic at least 10 times greater than a third impedance across the drain-to-source of the transistor switch at a third harmonic. In some embodiments, the isolated Fai 2 inverter further comprises a second inductor and a second capacitor, the second inductor coupled in series to the second capacitor, and the serially coupled second conductor and second capacitor coupled in parallel to the transistor switch, further wherein the second inductor and the second capacitor are tuned to resonate at approximately twice a frequency as a switching frequency of the transistor switch, and to make a second impedance value across the drain to source of the transistor switch at a second harmonic substantially zero. In some embodiments, the first impedance, the second impedance, and the third impedance cause a voltage across the drain-to-source of the transistor switch to have a substantially trapezoidal waveform. In some embodiments, the first rectifying element comprises a first rectifying diode, and the second rectifying element comprises a second rectifying diode. In other embodiments, the first rectifying element comprises a first synchronous rectifying transistor, and the second rectifying element comprises a second synchronous rectifying transistor. In some embodiments, the power convert further comprises a first self-driven driving circuit coupled to the first synchronous rectifying transistor, and a second self-driven driving circuit coupled to the second synchronous rectifying transistor. In some embodiments, the resonant rectifier circuit includes a resonant tank comprising a resonant inductor and a resonant capacitor. In some embodiments, the isolated inverter circuit comprises a transformer having a primary winding and a secondary winding, and a transistor switch, wherein the primary winding is coupled between a high side of an input voltage source and the transistor switch such that a first terminal of the primary winding is coupled to the high side of the input voltage source and a second terminal of the primary winding is coupled to the transistor switch. In some embodiments, the isolated inverter circuit comprises a transformer having a primary winding and a secondary winding, and a transistor switch, wherein the primary winding is coupled in parallel to the transistor switch such that a terminal of the primary winding is coupled to a low side of an input voltage source.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to a Fai 2 converter. Those of ordinary skill in the art will realize that the following detailed description of the Fai 2 converter is illustrative only and is not intended to be in any way limiting. Other embodiments of the Fai 2 converter will readily suggest themselves to such skilled persons having the benefit of this disclosure.

Reference will now be made in detail to implementations of the Fai 2 converter as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 4:
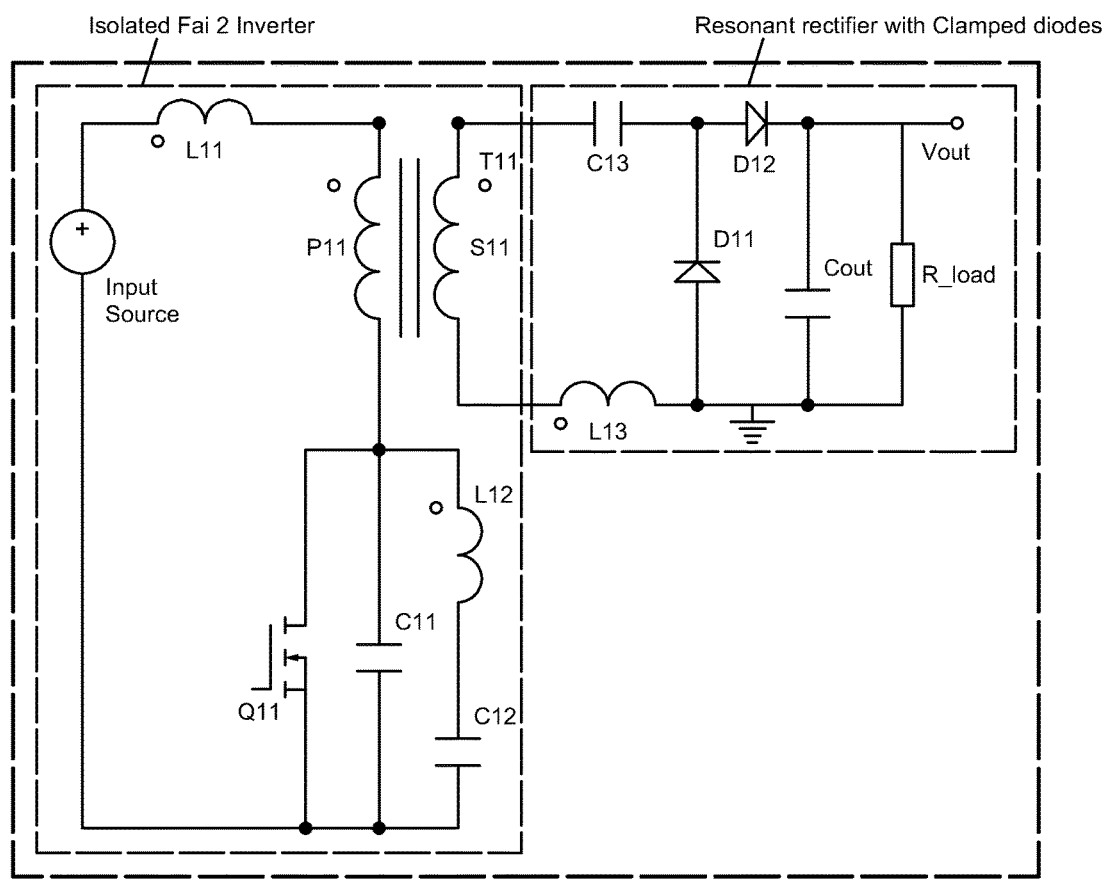
FIG. 4 illustrates a circuit diagram of a Fai 2 converter with clamped rectifier and a high side transformer according to an embodiment.

FIG. 4 illustrates a circuit diagram of an isolated Fai 2 converter with clamped rectifier and a high side transformer according to an embodiment. The Fai 2 converter of FIG. 4 is a two stage power converter including an isolated Fai 2 inverter and a resonant rectifier with clamped diodes. The isolated Fai 2 inverter is an isolated boost type converter including an inductor L11, a transformer T11, a transistor switch Q11, a capacitor C11, an inductor L12, and a capacitor C12, coupled to an input DC voltage source. The transformer T11 includes a primary winding P11 and a secondary winding S11. A first node of the inductor L11 is coupled to a first node on the input DC voltage source. A second node of the inductor L11 is coupled to a first node of the primary winding P11. A second node of the primary winding P11 is coupled to a first node of the transistor switch Q11, a first node of the capacitor C11, and a first node of the inductor L12. A second node of the inductor L12 is coupled to a first node of the capacitor C12. A second node of the transistor switch Q11, a second node of the capacitor C11, and a second node of the capacitor C12 are commonly connected to a second node of the input DC voltage source, which are all coupled to an input ground. A third node of the transistor switch Q11 is coupled to a driving circuit (not shown) or control circuit (not shown) configured to provide a driving signal to the transistor switch Q11. In some embodiments, the transistor switch Q11 is a metal-oxide-semiconductor field-effect transistors (MOSFETs). Alternatively, other types of semiconductor transistors can be used.

The resonant rectifier with clamped diodes includes a capacitor C13, a diode D11, a diode D12, an inductor L12, and an output capacitor Cout. A load represented as R_load is coupled to the output capacitor Cout. A first node of the capacitor C13 is coupled to a first node of the secondary winding S11. A second node of the capacitor C13 is coupled to a cathode of the diode D11 and to an anode of the diode D12. A cathode of the diode D12 is coupled to a first node of the output capacitor Cout. A second node of the output capacitor Cout and an anode of the diode D11 are commonly connected to a first node of the inductor L13. A second node of the inductor L13 is coupled to a second node of the secondary winding S11, which are all coupled to an output ground.

In operation, the inductor L12 and the capacitor C12 are in series and are tuned to resonate at close to twice the frequency as the switching frequency of the transistor switch Q11, resulting in a low impedance value (close to zero) across the drain to source of the transistor switch Q1 at the second harmonic. The inductor L11 and the capacitor C11 are tuned to make the impedance across the drain to source of the transistor switch Q1 at the fundamental harmonic far greater than the impedance across the drain to source of the transistor switch Q1 at the third harmonic. In some embodiments, the impedance at the fundamental harmonic is at least 10 times greater than the impedance at the third harmonic, so as to achieve a Vds_Q11 waveform that is substantially trapezoidal. The trapezoidal waveform provides a lower peak voltage, as compared to a non-Fai 2 converter, and also enables improved zero voltage switching (ZVS) of the transistor switch Q11. The inductor L13 and C13 form an LC network to adjust the output power. For example, the output voltage Vout can be expressed by the equation: Vout= (Req*Z4)/(Req*(Z3+Z4)+(Z3*Z4))*Vac, where Z3 is the impedance of the inductor L13, Z4 is the impedance of the capacitor C13, and Req is an equivalent load seen from the anode of diode D12.

Figure 1:
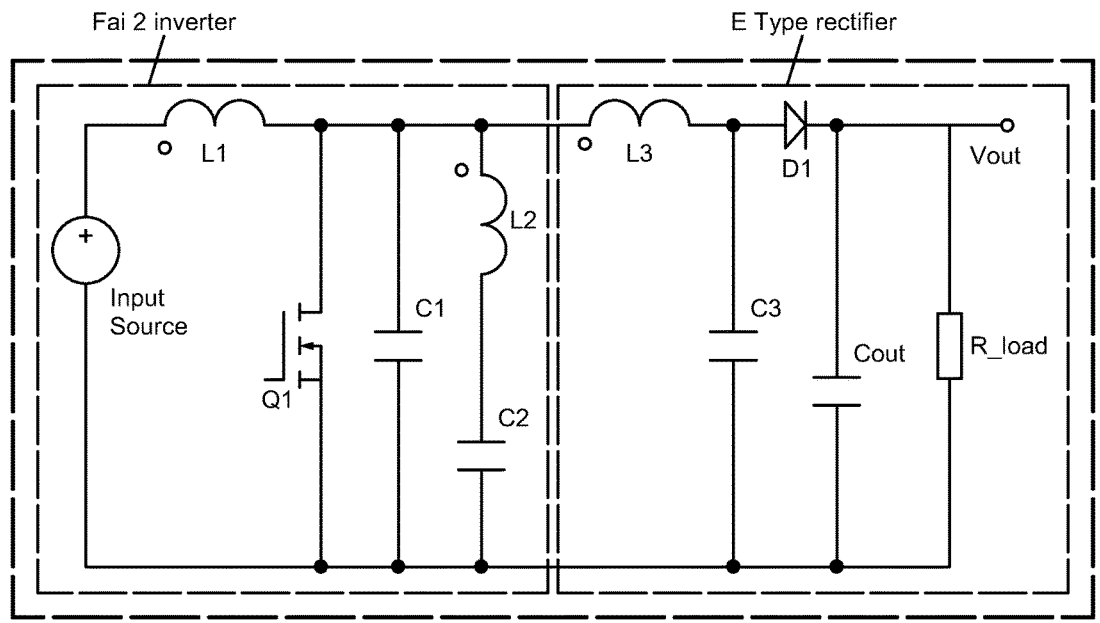
FIG. 1 illustrates a schematic circuit diagram of a conventional boost Fai 2 converter.

The diode D11, the diode D12, and the output capacitor Cout form a rectified filter network. Voltage stress of diodes D1, D2 is limited to a maximum voltage, which is equal to the output voltage. Compared to the conventional Fai 2 converters in FIGS. 1 and 2, the Fai 2 converter of FIG. 4 has a lower conduction voltage drop across the rectifier diodes which improves converter efficiency.

Figure 5:
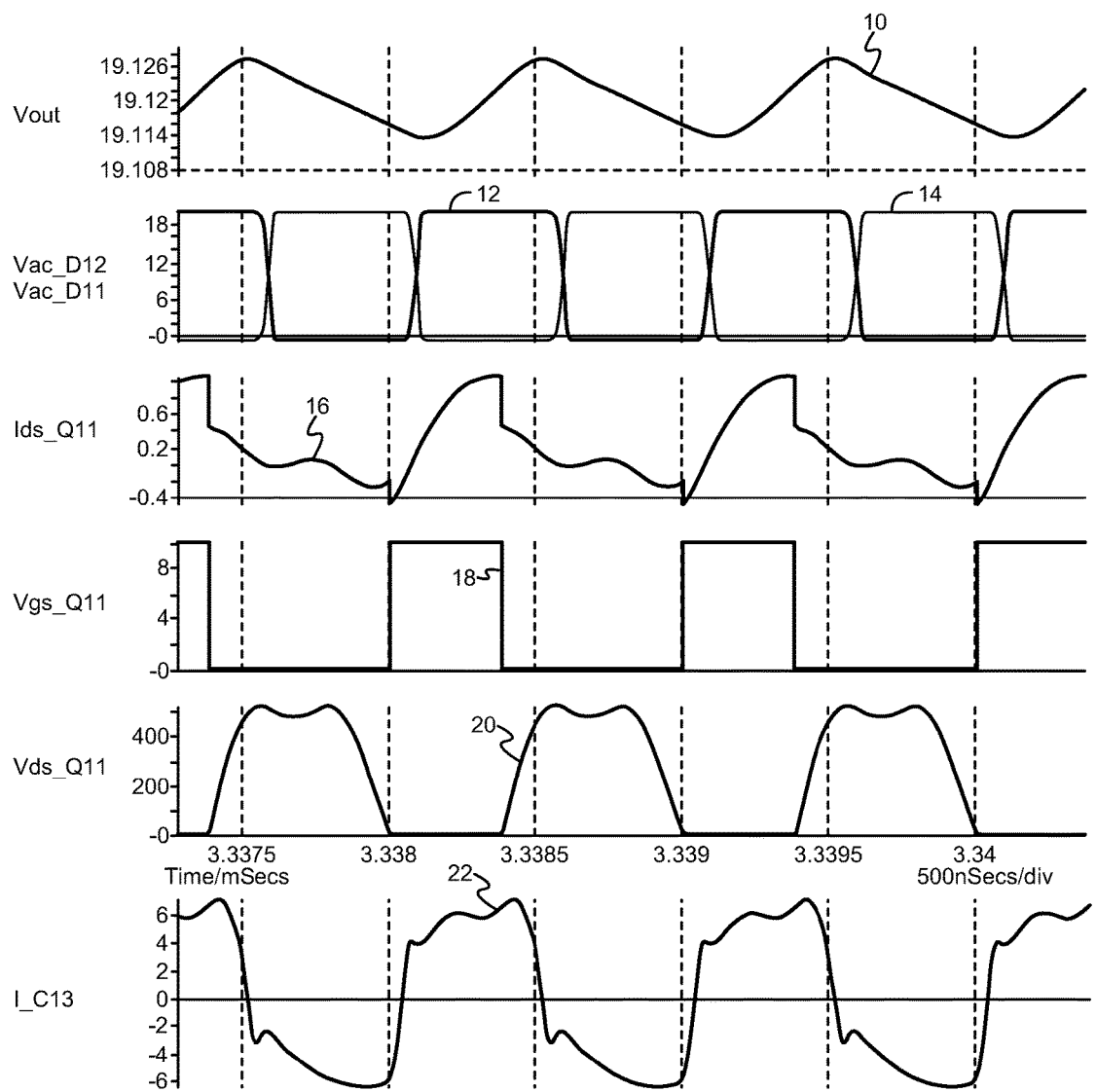
FIG. 5 illustrates exemplary voltage waveforms corresponding to the isolated Fai2 converter of FIG. 4.

FIG. 5 illustrates exemplary voltage waveforms corresponding to the isolated Fai2 converter of FIG. 4. The waveform 10 shows the output voltage Vout. The waveform 12 shows the voltage stress V_D11 of the rectifier D11. The waveform 14 shows the voltage stress V_D12 of the rectifier D12. The waveform 16 shows the drain current Ids Q11 of the transistor switch Q11. The waveform 18 shows the driving signal Vgs_Q11 applied to the transistor switch Q11. The waveform 20 shows the drain to source voltage Vds_Q11 of the transistor switch Q11. The waveform 22 shows the current I_C13 through the capacitor C13. The waveforms 10-22 show the Fai 2 converter of FIG. 4 is a multi-resonant converter due to the multiple resonant circuit components C11, C12, L12.

When the resonant current I_C13 increases from zero (where positive current is considered current flowing in the direction from the secondary winding S11 through the capacitor C13), the voltage across the diode D11 starts to increase from zero and the voltage across the diode D12 starts to decrease from the clamped output voltage level. When the voltage across the diode D11 increases to the output voltage level, the diode D12 conducts and the voltage across D11 is limited (clamped) to the output voltage level. Likewise, when the resonant current I_C13 decrease from zero, the voltage across the diode D12 starts to increase from zero and voltage across the diode D11 starts to decrease from the clamped output voltage level. When the voltage across the diode D12 increases to the output voltage level, the diode D11 conducts and the voltage across the diode D12 is limited (clamped) to the output voltage level.

Figure 2:
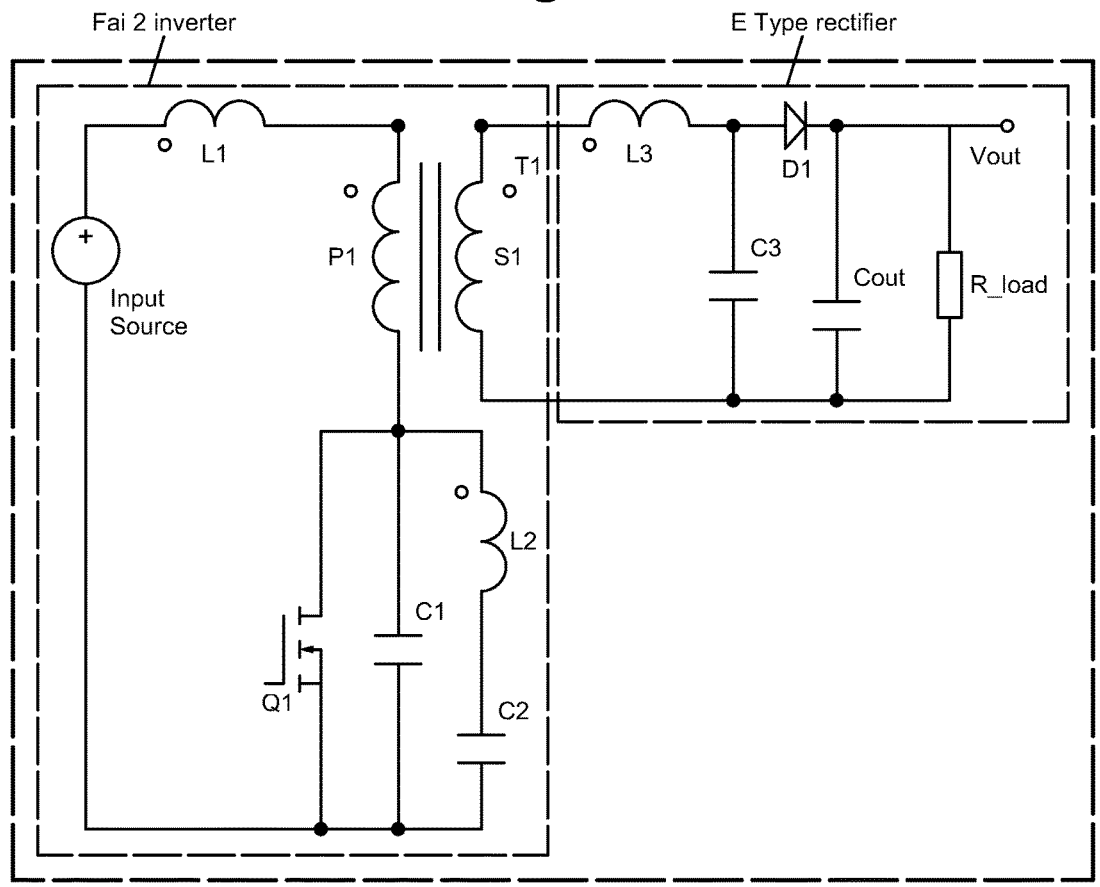
FIG. 2 illustrates a schematic circuit diagram of a conventional isolated boost Fai2 converter.
Figure 3:
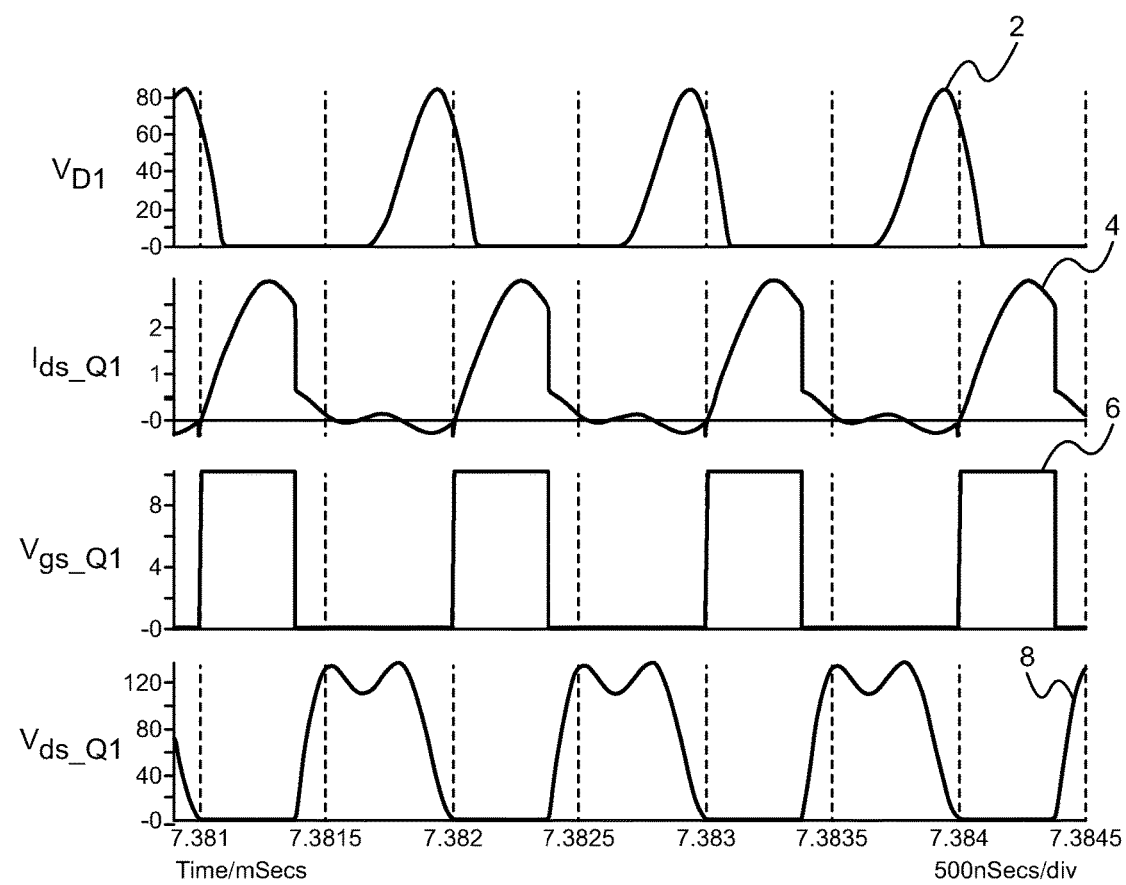
FIG. 3 illustrates voltage waveforms corresponding to the isolated Fai2 converter of FIG. 2.

By way of comparison, the voltage stress of diodes used in the prior art, such as diode D1 in FIG. 2, is about 3 to 5 times greater than the output voltage level, but the voltage stress of the diodes D11 and D12 used in the Fai 2 converter of FIG. 4 is equal to the output voltage level. As such, the diodes D11 and D12 can be selected as low voltage stress diodes with low conduction voltage drop.

Figure 6:
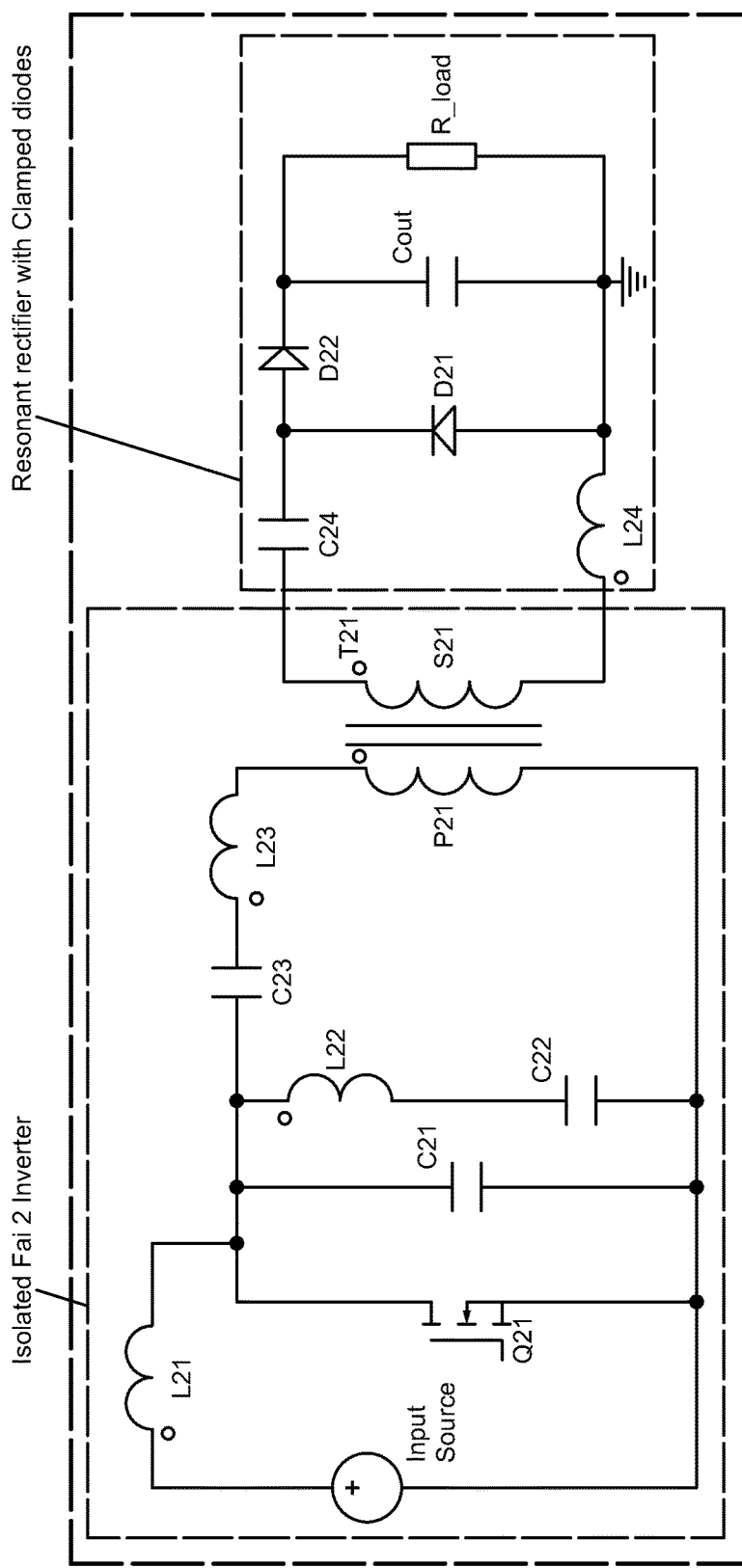
FIG. 6 illustrates a circuit diagram of a Fai 2 converter with clamped rectifier and a low side transformer according to an embodiment.

The Fai 2 converter shown in FIG. 4 has the transformer connected to the high side of the input AC voltage source. Alternatively, the Fai 2 converter can be configured with the transformer connected to the low side of the input DC voltage source. FIG. 6 illustrates a circuit diagram of a Fai 2 converter with clamped rectifier and a low side transformer according to an embodiment. The Fai 2 converter of FIG. 6 is a two stage power converter including an isolated Fai 2 inverter and a resonant rectifier with clamped diodes. The isolated Fai 2 inverter is an isolated boost type converter including an inductor L21, a transistor switch Q21, a capacitor C21, an inductor L22, a capacitor C22, a capacitor C23, an inductor L23, and a transformer T21, coupled to an input DC voltage source. The transformer T21 includes a primary winding P21 and a secondary winding S21.

A first node of the inductor L21 is coupled to a first node on the input DC voltage source. A second node of the inductor L21 is coupled to a first node of the transistor switch Q21, a first node of the capacitor C21, a first node of the inductor L22, and a first node of the capacitor C23. A second node of the capacitor C23 is coupled to a first node of the inductor L23. A second node of the inductor L23 is coupled to a first node of the primary winding P21. A second node of the inductor L12 is coupled to a first node of the capacitor C12. A second node of the primary winding P21, a second node of the transistor switch Q21, a second node of the capacitor C21, and a second node of the capacitor C22 are commonly connected to a second node to the input DC voltage source, these second nodes are each also coupled to input ground. A third node of the transistor switch Q21 is coupled to a driving circuit (not shown) or control circuit (not shown) configured to provide a driving signal to the transistor switch Q21. In some embodiments, the transistor switch Q21 is a metal-oxide-semiconductor field-effect transistors (MOSFETs). Alternatively, other types of semiconductor transistors can be used.

The resonant rectifier with clamped diodes includes a capacitor C24, a diode D21, a diode D22, an inductor L24, and an output capacitor Cout. A load represented as R_load is coupled to the output capacitor Cout. A first node of the capacitor C24 is coupled to a first node of the secondary winding S21. A second node of the capacitor C24 is coupled to a cathode of the diode D21 and to an anode of the diode D22. A cathode of the diode D22 is coupled to a first node of the output capacitor Cout. A second node of the output capacitor Cout and an anode of the diode D21 are commonly connected to a first node of the inductor L24, which are all coupled to output ground. A second node of the inductor L24 is coupled to a second node of the secondary winding S21.

The capacitor C23 functions as a DC blocking capacitor which is used to prevent the transformer from saturating. The inductor L23 is used together with the inductor L24 and the capacitor C24 for impedance matching to adjust the output voltage. The inductors L23 and L24 can be replaced by the leakage inductance of the transformer. The Fai 2 converter with high side transformer has a simpler configuration than the Fai 2 converter with low side transformer, but the Fai 2 converter with low side transformer has lower common-mode (CM) noise from the transformer. A CM filter is easy to design for the Fai 2 converter with low side transformer because the second node of the primary winding P21 is connected to input ground and the second node of the secondary winding S21 is connected to output ground. Also, the signal between input ground and output ground is DC, not a high-frequency AC signal, so the CM current between primary side and secondary side is low for the Fai 2 converter with low side transformer compared to the Fai 2 converter with high side transformer.

Figure 7:
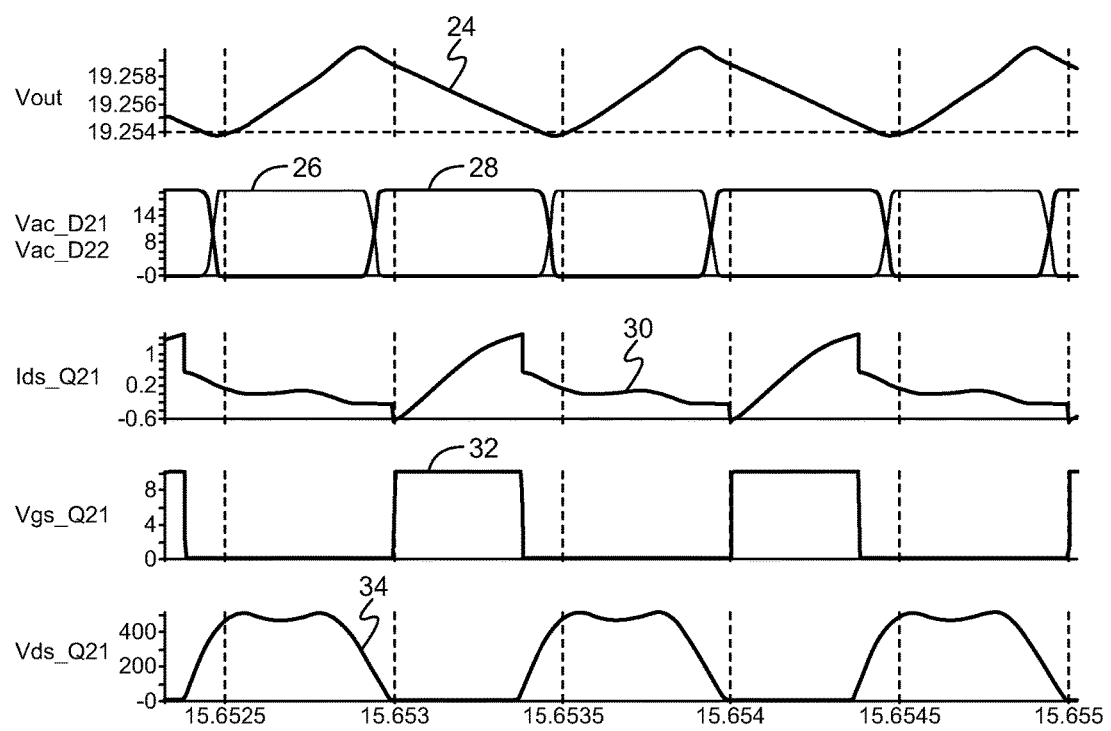
FIG. 7 illustrates exemplary voltage waveforms corresponding to the isolated Fai2 converter with low side transformer of FIG. 6.

FIG. 7 illustrates exemplary voltage waveforms corresponding to the isolated Fai2 converter with low side transformer of FIG. 6. The waveform 24 shows the output voltage Vout. The waveform 26 shows the voltage stress V_D21 of the rectifier D21. The waveform 28 shows the voltage stress V_D22 of the rectifier D22. The waveform 30 shows the drain current Ids_Q21 of the transistor switch Q21. The waveform 32 shows the driving signal Vgs_Q21 applied to the transistor switch Q21. The waveform 34 shows the drain to source voltage Vds_Q21 of the transistor switch Q21. The waveforms 24-34 show the Fai 2 converter of FIG. 6 is a multi-resonant converter due to the multiple resonant circuit components C21, C22, L22.

The Fai 2 converter with clamped rectifier and low side transformer operates similarly as the Fai 2 converter with clamped rectifier and high side transformer. When the resonant current through the capacitor C24 increases from zero (where positive current is considered current flowing in the direction from the secondary winding S21 through the capacitor C23), the voltage across the diode D21 starts to increase from zero and the voltage across the diode D22 starts to decrease from the clamped output voltage level. When the voltage across the diode D21 increases to the output voltage level, the diode D22 conducts and the voltage across D21 is limited (clamped) to the output voltage level. Likewise, when the resonant current through the capacitor C24 decrease from zero, the voltage across the diode D22 starts to increase from zero and voltage across the diode D21 starts to decrease from the clamped output voltage level. When the voltage across the diode D22 increases to the output voltage level, the diode D21 conducts and the voltage across the diode D22 is limited (clamped) to the output voltage level.

Figure 8:
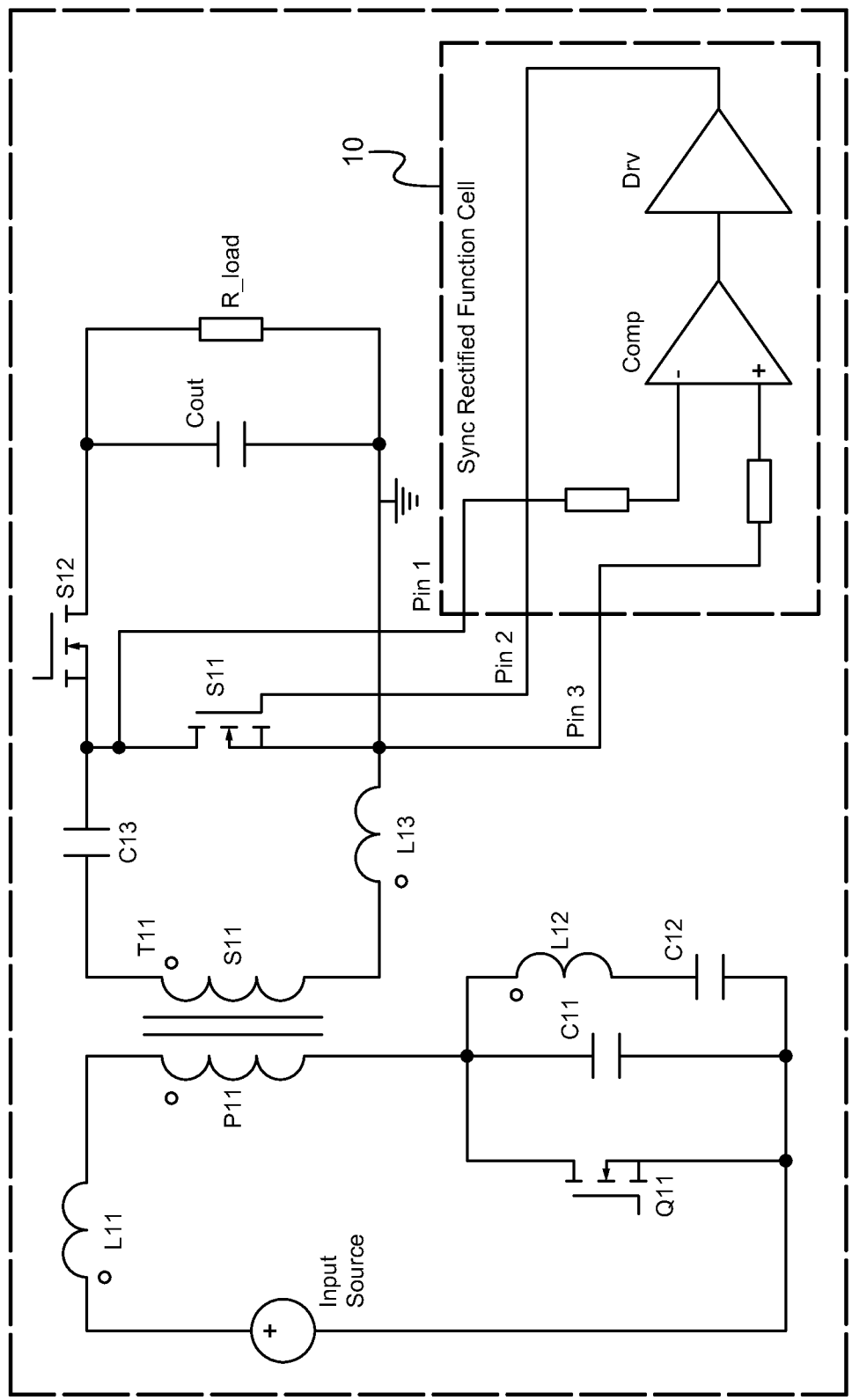
FIG. 8 illustrates a Fai 2 converter with clamped rectifier and a high side transformer according to other embodiments.

In some embodiments, the rectifying diodes D11 and D12 are replaced with synchronous rectifying transistors. Each synchronous rectifying transistor can be coupled to a self-driven driving circuit, referred to as a synchronous rectified function cell. FIG. 8 illustrates a Fai 2 converter with clamped rectifier and a high side transformer according to other embodiments. The Fai 2 converter of FIG. 8 is the same as the Fai 2 converter as FIG. 4, but the rectifying diodes D11 and D22 are replaced with synchronous rectifying transistors S11 and S12, respectively. The synchronous rectifying transistor S11 is driven by the synchronous rectified function cell 10. Although not shown in FIG. 8, the synchronous rectifying transistor S12 can be driven by a similar synchronous rectified function cell. The operation of the Fai 2 converter of FIG. 8 is similar to that of the Fai 2 converter of FIG. 4. It is understood, that the Fai 2 converter with clamped rectifier and low side transformer of FIG. 6 can be similarly adapted to replace the rectifying diodes D21 and D22 with synchronous rectifying transistors and corresponding synchronous rectified function cells.

Figure 9:
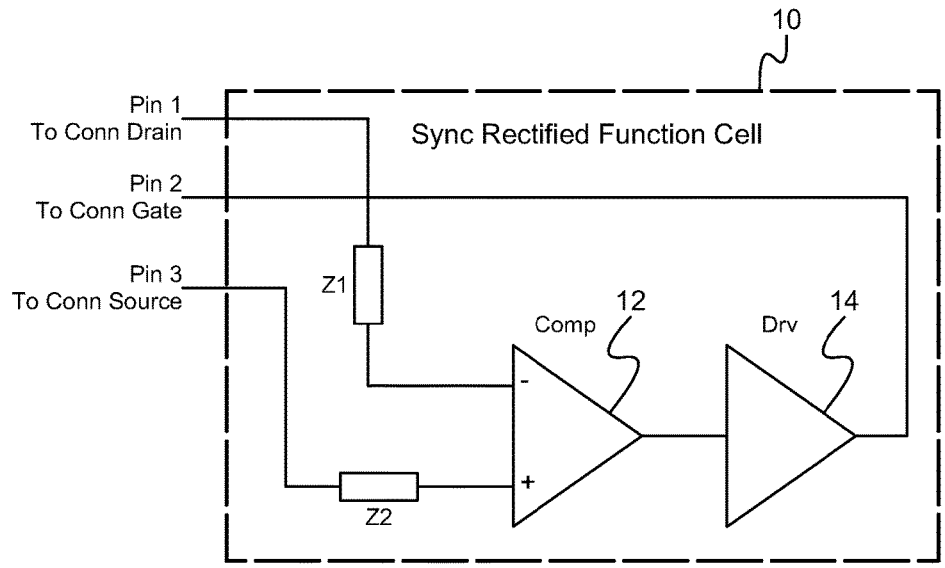
FIG. 9 illustrates a schematic circuit diagram of an exemplary synchronous rectified function cell according to some embodiments.

FIG. 9 illustrates a schematic circuit diagram of an exemplary synchronous rectified function cell according to some embodiments. The synchronous rectified function cell 10 includes an impedance element Z1, an impedance element Z2, a comparator 12 and a driving amplifier 14. The impedance element Z1 is coupled between the drain of the synchronous rectifying transistor and a positive input of the comparator 12. The impedance element Z2 is coupled between the source of the synchronous rectifying transistor and a negative input of the comparator 12. An output of the comparator 12 is coupled as an input to the driving amplifier 14. An output of the driving amplifier is coupled to the gate of the synchronous rectifying transistor.

The comparator 12 of the synchronous rectified function cell detects a voltage difference between the drain and source of the synchronous rectifying transistor. When the voltage of the drain is higher than the voltage of the source, the driving signal output to the gate of the synchronous rectifying transistor is low. The low level driving signal turns OFF the synchronous rectifying transistor. When the voltage of the drain is lower than the voltage of the source, the driving signal output to the gate of the synchronous rectifying transistor is high, and the synchronous rectifying transistor is turned ON.

Figure 10:
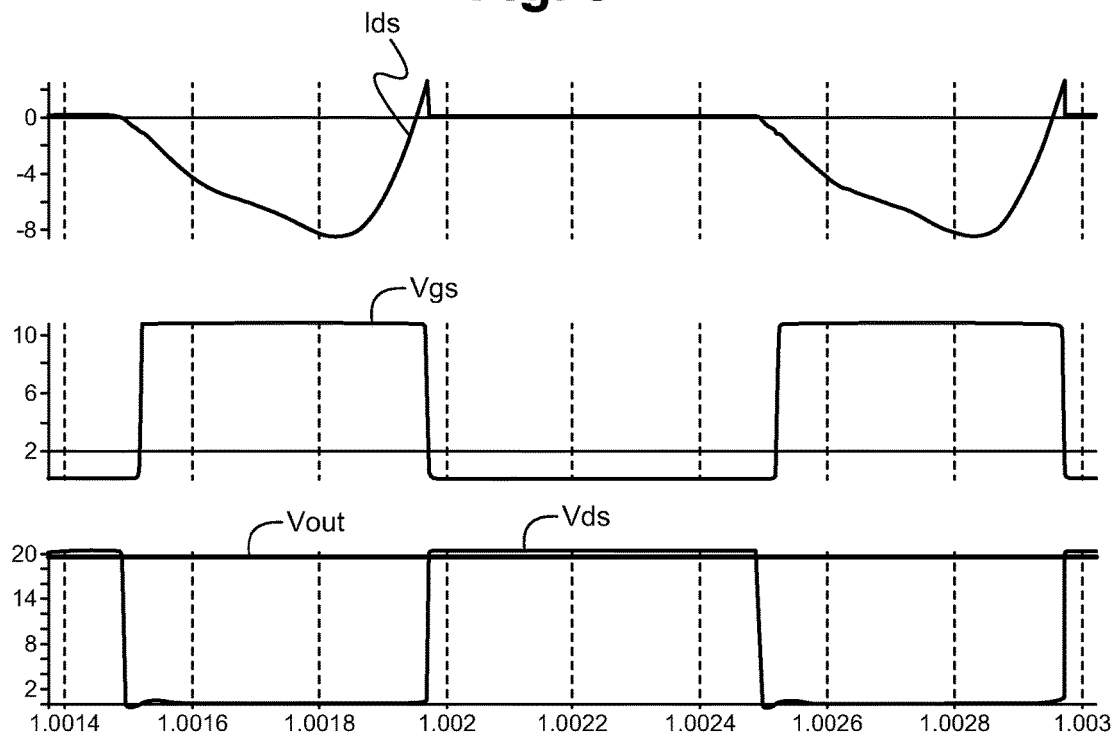
FIG. 10 illustrates exemplary waveforms corresponding to one of the synchronous rectifying transistors driven by the synchronous rectified function cell.

FIG. 10 illustrates exemplary waveforms corresponding to one of the synchronous rectifying transistors driven by the synchronous rectified function cell. The waveforms include the current Ids through the synchronous rectifying transistor, the driving voltage Vgs applied to the synchronous rectifying transistor, and the drain-to-source voltage Vds of the synchronous rectifying transistor as compared to the output voltage Vout. The waveforms show that the Fai 2 converter can achieve synchronous rectification, Zero Voltage Switching (ZVS) can be used to turn ON the synchronous rectifying transistor, and the voltage stress across synchronous rectifying transistor is clamped to the output voltage.

The present application has been described in terms of specific embodiments incorporating details to facilitate the understanding of the principles of construction and operation of the Fai 2 converter. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A power converter comprising:
   a. an isolated inverter circuit coupled to an input voltage source;
   b. a resonant rectifier circuit coupled to the isolated inverter circuit, wherein the resonant rectifier circuit comprises a first rectifying element and a second rectifying element, further wherein the first rectifying element and the second rectifying element each have a voltage stress limited to an output voltage level of the resonant rectifier circuit.

2. The power converter of claim 1 wherein the isolated inverter circuit comprises an isolated Fai 2 inverter.

3. The power converter of claim 2 wherein the isolated Fai 2 inverter comprises a transistor switch, a first inductor, and a first capacitor, further wherein the first inductor and the first capacitor are tuned to make a first impedance across the drain-to-source of the transistor switch at a fundamental harmonic at least 10 times greater than a third impedance across the drain-to-source of the transistor switch at a third harmonic.

4. The power converter of claim 3 wherein the isolated Fai 2 inverter further comprises a second inductor and a second capacitor, the second inductor coupled in series to the second capacitor, and the serially coupled second conductor and second capacitor coupled in parallel to the transistor switch, further wherein the second inductor and the second capacitor are tuned to resonate at approximately twice a frequency as a switching frequency of the transistor switch, and to make a second impedance value across the drain to source of the transistor switch at a second harmonic substantially zero.

5. The power converter of claim 4 wherein the first impedance, the second impedance, and the third impedance cause a voltage across the drain-to-source of the transistor switch to have a substantially trapezoidal waveform.

6. The power converter of claim 1 wherein the first rectifying element comprises a first rectifying diode, and the second rectifying element comprises a second rectifying diode.

7. The power converter of claim 1 wherein the first rectifying element comprises a first synchronous rectifying transistor, and the second rectifying element comprises a second synchronous rectifying transistor.

8. The power convert of claim 7 further comprising a first self-driven driving circuit coupled to the first synchronous rectifying transistor, and a second self-driven driving circuit coupled to the second synchronous rectifying transistor.

9. The power converter of claim 1 wherein the resonant rectifier circuit includes a resonant tank comprising a resonant inductor and a resonant capacitor.

10. The power converter of claim 1 wherein the isolated inverter circuit comprises a transformer having a primary winding and a secondary winding, and a transistor switch, wherein the primary winding is coupled between a high side of an input voltage source and the transistor switch such that a first terminal of the primary winding is coupled to the high side of the input voltage source and a second terminal of the primary winding is coupled to the transistor switch.

11. The power converter of claim 1 wherein the isolated inverter circuit comprises a transformer having a primary winding and a secondary winding, and a transistor switch, wherein the primary winding is coupled in parallel to the transistor switch such that a terminal of the primary winding is coupled to a low side of an input voltage source.

* * * * *